(12) United States Patent
Dolson

(10) Patent No.: US 10,313,416 B2
(45) Date of Patent: Jun. 4, 2019

(54) DYNAMIC LATENCY CONTROL

(71) Applicant: NXP B.V., Eindhoven (NL)

(72) Inventor: Mark Barry Dolson, Ben Lomond, CA (US)

(73) Assignee: NXP B.V., Eindhoven (NL)

( * ) Notice: Subject to any disclaimer, the term of this patent is extended or adjusted under 35 U.S.C. 154(b) by 83 days.

(21) Appl. No.: 15/656,680

(22) Filed: Jul. 21, 2017

(65) Prior Publication Data

US 2019/0028528 A1   Jan. 24, 2019

(51) Int. Cl.
| | | |
|---|---|---|
| *G10L 21/057* | (2013.01) | |
| *G10L 21/0208* | (2013.01) | |
| *G10L 21/02* | (2013.01) | |
| *H04L 29/06* | (2006.01) | |
| *G10L 21/055* | (2013.01) | |
| *G10L 19/16* | (2013.01) | |

(52) U.S. Cl.
CPC ............ *H04L 65/602* (2013.01); *G10L 21/02* (2013.01); *G10L 21/0208* (2013.01); *G10L 21/057* (2013.01); *H04L 65/80* (2013.01); *G10L 19/167* (2013.01); *G10L 21/055* (2013.01)

(58) Field of Classification Search
None
See application file for complete search history.

(56) References Cited

U.S. PATENT DOCUMENTS

| | | |
|---|---|---|
| 9,177,570 B2 | 11/2015 | Fex et al. |
| 9,437,211 B1 | 9/2016 | Su |
| 2003/0021285 A1* | 1/2003 | Denninghoff ........... H04L 47/10 370/428 |
| 2005/0047396 A1* | 3/2005 | Helm ...................... H04L 47/10 370/352 |
| 2005/0058146 A1* | 3/2005 | Liu ........................ H04J 3/0632 370/412 |
| 2006/0045139 A1* | 3/2006 | Black .................... G10L 19/005 370/516 |
| 2007/0186145 A1 | 8/2007 | Ojala et al. |
| 2009/0059806 A1* | 3/2009 | Li .......................... G10L 19/005 370/252 |
| 2011/0077945 A1* | 3/2011 | Ojala ...................... G10L 21/04 704/262 |

(Continued)

FOREIGN PATENT DOCUMENTS

| | | |
|---|---|---|
| CN | 103404053 A | 11/2013 |
| EP | 1982332 A1 | 10/2008 |
| WO | 2017/074565 A1 | 5/2017 |

OTHER PUBLICATIONS

Extended European Search Report for European patent appln. 18183626.3 (dated Jan. 4, 2019).

*Primary Examiner* — Ajit Patel

(57) ABSTRACT

As may be implemented in a manner consistent with one or more embodiment, aspects of the disclosure are directed to latency control with signals, such as audio signals. For instance, a quality characteristic of an audio signal having time-sequenced frames exhibiting a signal quality can assessed, and an output indicative of the signal quality is provided based on the assessment. An amount of latency in the audio signal is dynamically adjusted based on the output, and the latency can be used in processing the time-sequenced frames, such as to use future frames in assessing or correcting a current frame during a time period facilitated via the latency.

20 Claims, 3 Drawing Sheets

(56) References Cited

U.S. PATENT DOCUMENTS

| | | | |
|---|---|---|---|
| 2011/0208517 A1* | 8/2011 | Zopf | G10L 19/005 704/211 |
| 2012/0117225 A1* | 5/2012 | Kordasiewicz | H04L 65/1083 709/224 |
| 2014/0071978 A1* | 3/2014 | Hubner | H04L 12/6418 370/352 |
| 2014/0172420 A1 | 6/2014 | Taleb et al. | |
| 2014/0358264 A1* | 12/2014 | Long | G10H 1/0058 700/94 |
| 2015/0095452 A1* | 4/2015 | Agarwal | H04L 65/602 709/217 |
| 2015/0139349 A1* | 5/2015 | Hamzeh | H04L 1/20 375/285 |
| 2017/0063704 A1* | 3/2017 | Krinsky | H04L 47/283 |
| 2017/0331756 A1* | 11/2017 | Kummel | H04L 47/54 |

\* cited by examiner

| Input Frame | Output Frame |
|---|---|
| 0 (all zeros) | 0 (all zeros) |
| 1 | 0 (all zeros) |
| 2 | F(0, 1, 2) |
| 3 | F(1, 2, 3) |
| 4 | F(2, 3, 4) |
| 5 | Extrapolation #1 of F(2,3,4) |
| 6 | Extrapolation #2 of F(2,3,4) |
| 7 | G(1,2,3,4,5,6,7) |
| 8 | G(2,3,4,5,6,7,8) |
| 9 | G(3,4,5,6,7,8,9) |
| 10 | G(4,5,6,7,8,9,10) |
| 11 | F(9,10,11) |
| 12 | F(10,11,12) |
| 13 | F(11,12,13) |

FIG. 2

DYNAMIC LATENCY CONTROL

OVERVIEW

Aspects of various embodiments are directed to signal processing with dynamic latency control.

Signal communications can be susceptible to signal quality issues as may arise from one or more of multitude of sources. For instance voice communications can be susceptible to signal quality issues due to background noise or wind noise. In general, audio communications may also be susceptible to signal noise or other issues injected during electronic communication. While signal quality can be enhanced using a variety of approaches, doing so can adversely affect signal reception timing and quality of any audible sound that is generated.

These and other matters have presented challenges to signal processing implementations, for a variety of applications.

SUMMARY

Various example embodiments are directed to issues such as those addressed above and/or others which may become apparent from the following disclosure concerning the communication and processing of signals, such as audio signals, and controlling the communication in a desirable manner. For instance, trade-offs can be made between signal quality and latency, to facilitate an enjoyable user experience. In certain example embodiments, aspects of the present disclosure involve dynamically adjusting latency in audio signal communications to facilitate processing of the audio signal and related generation of audible sound.

As may be implemented in accordance with one or more embodiments, methods and/or apparatuses involve the following. A quality characteristic of an audio signal having time-sequenced frames exhibiting a signal quality is assessed, and an output indicative of the signal quality is output based on the assessment. An amount of latency in the audio signal is dynamically adjusted based on the output indicative of the signal quality. For instance, latency can be increased where increased processing is needed and/or a particular application may tolerate increased latency, to facilitate the generation of a more accurate or desirable signal. Latency can be decreased where increased processing is not needed and/or a particular application may be less tolerant of latency (e.g. real-time full duplex conversation). Utilizing the dynamically adjusted latency, and for each of the time-sequenced frames, one or more additional frames corresponding to a future time are assessed and the time-sequenced frame is modified based on the assessment of the additional frame(s). Such an approach may, for example, be carried out in an apparatus, such as with an input circuit that receives the audio signal and a computer or other processing circuit that carries out the various assessments.

A particular apparatus embodiments may be implemented as follows. A first circuit is configured and arranged to assess a quality characteristic of an audio signal exhibiting a signal quality, and to provide an output indicative of the signal quality. A second circuit is configured and arranged to dynamically adjust an amount of latency in the audio signal, based on the output indicative of the signal quality. A third circuit is configured and arranged with the second circuit to assess at least one additional frame corresponding to a future time using time provided via the latency, and to modify respective time-sequenced frames in the audio signal based on the assessment of the at least one additional frame.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIG. 2 is a table for implementing input and output frames, and as may be implemented in accordance with the present disclosure.

Figure 1:
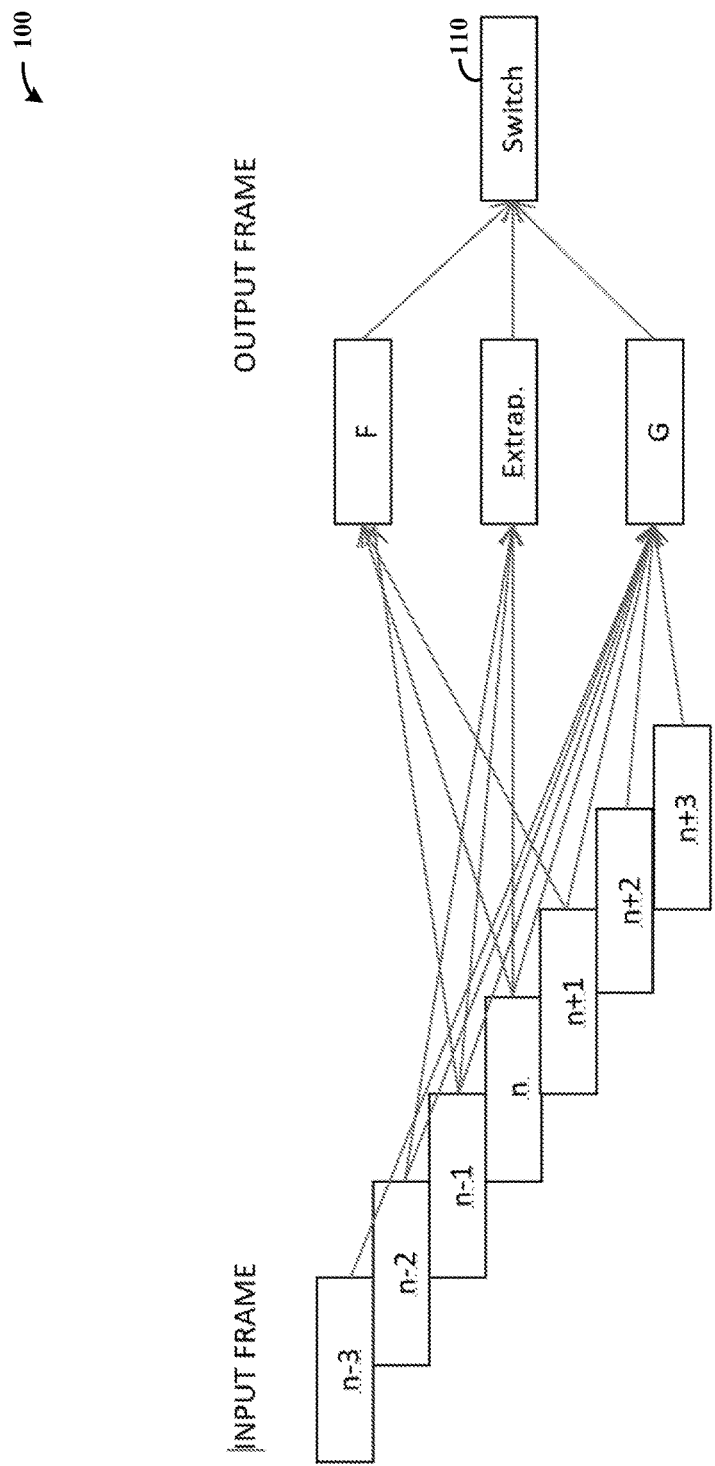
FIG. 1 illustrates an example approach to implementing input and output frames for audio communication, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving signal processing, such as audio signal processing, in which signal latency can be utilized. In certain implementations, aspects of the present disclosure have been shown to be beneficial when used in the context of audio signal processing in which latency is controlled. In some embodiments, such latency control is effected to achieve a desirable tradeoff between latency, which may result in some lag in communication of audio signals, and one or both of quality and timing of the signal and/or resulting audible sound generated from the signal. Such implementations can be particularly useful when communicating audio in real-time such as in voice communications, or in applications in which timing of the audio reception may be important, such as to avoid interruption of streaming audio and/or timing issues with related media content such as accompanying video. While not necessarily so limited, various aspects may be appreciated through the following discussion of non-limiting examples which use exemplary contexts, such as contexts involving audio signals, which may be implemented for other types of signals.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments are directed toward addressing challenges involving speech enhancement algorithms for voice communication, which are tightly constrained in the amount of latency that they can introduce into a signal path. Signal degradation, such as may result from intermittent wind noise caused by turbulent airflow over a voice-input microphone, can degrade the voice communication experience. This degradation can be effectively minimized for a particular portion of audio by providing a noise-suppression algorithm with signal look-ahead information obtained by looking at future portions of audio. Dynamic adjustment of such look-ahead is facilitated in an adaptively manner such that noise-suppression is enhanced, while maintaining an overall audio listening experience that may be maintained in a generally consistent manner with low-latency constraints.

Various apparatus embodiments involve implementation with circuitry, as may be carried out with a computer or other type processor, and as may be implemented separately or together in a combined circuit. Accordingly, while the following refers to first, second and third circuits, the apparatus may be implemented in a common circuit, such as a computer circuit programed to enhance signal communications. As such, one or more embodiments involve such a first circuit that assesses a quality characteristic of an audio signal exhibiting a signal quality and having time-sequenced frames. The first circuit provides an output indicative of the signal quality, and a second circuit dynamically adjusts an amount of latency in the audio signal, based on the output indicative of the signal quality. A third circuit operates with the second circuit to assess, for each of the time-sequenced frames, at least one additional frame corresponding to a future time using time provided via the latency, and to modify respective time-sequenced frames in the audio signal based on the assessment of the at least one additional frame.

In this or other contexts, the third circuit may assess noise in a number of additional ones of the time-sequenced frames corresponding to a future time relative to the frame being modified, based on a timeframe defined by the amount of latency. The second circuit is can increase or decrease the amount of latency to provide a desired number of the at least one additional frames to be assessed.

Consistent with the above, the first, second and third circuits may be implemented in a common circuit such as a computer, and utilized with an input port for receiving an audio signal. Such circuitry may, for example, be employed with mobile telephone circuitry for communicating voice or other audio signals, such as for live conversation and/or live or recorded audio media streaming. In these or other applications, the circuitry may be employed on a transmitter, a receiver, with circuitry that processes/communicates audio signals between such a transmitter and receiver, or at a combination of two or more of such locations.

The amount of latency in the audio signal can be dynamically adjusted (e.g., as implemented with a second circuit as above) in a variety of manners, to suit particular applications. In accordance with one or more embodiments, the amount of latency in the audio signal is dynamically adjusted based on a content characteristic of the audio in the signal and a predefined amount of acceptable latency associated with the content characteristic. Such a content characteristic may include live speech for duplex conversation, recorded audio, live-streamed audio, and/or audio time-synchronized with video being simultaneously presented.

The content characteristic may be indicative of one of a plurality of types of audio communication, wherein each type of audio communication has a predetermined amount of acceptable latency associated therewith.

In some embodiments, the amount of latency in an audio signal is dynamically adjusted based on an expected increase in quality of the signal gained relative to an increase in the latency. The amount of latency in the audio signal may be increased and decreased over time, in response to respective increases and decreases in quality of the signal. For instance, the amount of latency in the audio signal can be increased in response to the signal degrading beyond a predefined amount of degradation, and reduced in response to the signal recovering such that the amount of degradation of the signal is within the predefined amount. In some embodiments, a low-latency mode is effected in response to an audio signal exhibiting a high level of signal quality, and an increased-latency mode may be effected in response to the audio signal exhibiting a low level of signal quality that is lower than the high level of signal quality.

Latency can be controlled in a variety of manners, in accordance with various embodiments. In one embodiment, latency in the audio signal is increased by adding one or more time-sequenced frame to the audio signal, and decreased by removing at least one time-sequenced frame from the audio signal. Other embodiments involve latency injection involving buffers and/or other circuitry.

As noted above, embodiments herein may be implemented with speech-based audio. In some embodiments, parts of speech are identified in an audio signal, and the amount of latency is adjusted for different portions of the audio signal based on an identified part of speech that the portion pertains to. For instance, sentences can be identified and latency can be increased between sentences, and decreased during sentences, with increased latency being more tolerable during time periods that involve a pause in speech. In certain embodiments, an amount of latency is increased for portions of an audio signal corresponding to portions of a signal exhibiting low speech energy. Similarly, the amount of latency can be decreased for portions of the audio signal corresponding to portions of the signal exhibiting relatively higher speech energy.

The dynamic latency control can be utilized to provide enhanced processing in a variety of manners (e.g., such as may be implemented with the third circuit above). Generally, an additional frame or frames may be assessed by relative to a frame being corrected, using a timeframe provided by the latency. In some embodiments, noise is removed from each respective time-sequenced frame based on one or more additional frames assessed for the frame, with the time for such assessment being provided via the latency. For instance, noise may be assessed for a number of additional time-sequenced frames, with signal latency being increased or decreased to provide a desired number additional frames to be assessed. Fewer frames may be necessary to achieve noise reduction, for signals containing less noise, with those signals (or signal portions) containing higher noise, one or more additional frames may be added to enhance noise reduction. From a voice communication perspective, such approaches can be used to mitigate wind noise that may vary (sometimes significantly) during a conversation.

In some embodiments, a voice activity detector is used to identify time-windows in which the speech energy is minimal, for controlling the insertion and removal of latency without introducing objectionable noise bursts or other perceived discontinuities into the modified signal. Where energy in these time-windows consists predominantly of noise, the hearing system's ability to detect disruption in the resulting audio stream is significantly reduced. Hence, for example, to delay the audio stream by two additional time-windows, two "dummy" time-windows can be inserted such that each new time-window replicates the spectral magnitude values in each of two successive time-windows of a true input signal. The corresponding spectral phase values can be chosen such that the extra spectral time-slices will cause two additional time-windows to be generated and overlap-added into the "enhanced" output signal, so that the latency of this output signal is increased by two time-windows. For a sufficiently noisy time-window, random spectral phase values can be used. A phase-vocoder time-scaling technique can also be used to calculate new spectral phase values. Restoring the latency to its original value can be accomplished by deleting two (preferably non-consecutive) spectral time-windows, where two windows had been previously added.

In some embodiments, a complete signal path is implemented such that each input time-window corresponds to a unique output time-window. The signal enhancer operates on a delayed sequence of input time-windows where the delay is an integer ranging between MinDelay and MaxDelay, where MinDelay may be 1 and MaxDelay may be 3. The pointer to the "current" input time-window in this delayed input sequence can increment by one for each new input time-window, and the signal enhancer produces a unique output time-window for each unique value of this pointer. If this pointer sometimes fails to increment (i.e., when MaxDelay is being increased), the signal enhancer does not generate an output time-window, and an alternate output time-window is used instead. This alternate output time-window is an interpolated time-window generated from the preceding output time-window as described above.

Turning now to the figures, FIG. 1 shows an exemplary display of successive input and output frames and dynamic latency adjustment therewith, as may be implemented in accordance with one or more embodiments. For input time-sequenced frame n, three previous frames (n−1, n−2, n−3) and three future frames (n+1, n+2 and n+3) are shown. Latency is dynamically adjusted as noted herein, such that one, two or three of these future frames are available and used in processing frame n, such as to remove noise. For instance, in some embodiments the output may be switched at switch 110 between a combination of frames as respectively represented at F(n−1, n, n+1) and G(n−3, n−2, n−1, n, n+1, n+2, n+3) and back again, for low or high latency operation. Other embodiments involving using two frames before and after, or a different number of frames (e.g., three previous frames with one, two or three additional frames).

FIG. 2 depicts a table with respective input and output frame values, such as may be implemented in connection with FIG. 1 and/or other embodiments. Where used with FIG. 1, an algorithm may be implemented such that switching is effected from a low-latency mode (process F) to high-latency mode (process G) upon the input of frame #5, and switch back again upon the input of frame #11.

Figure 3:
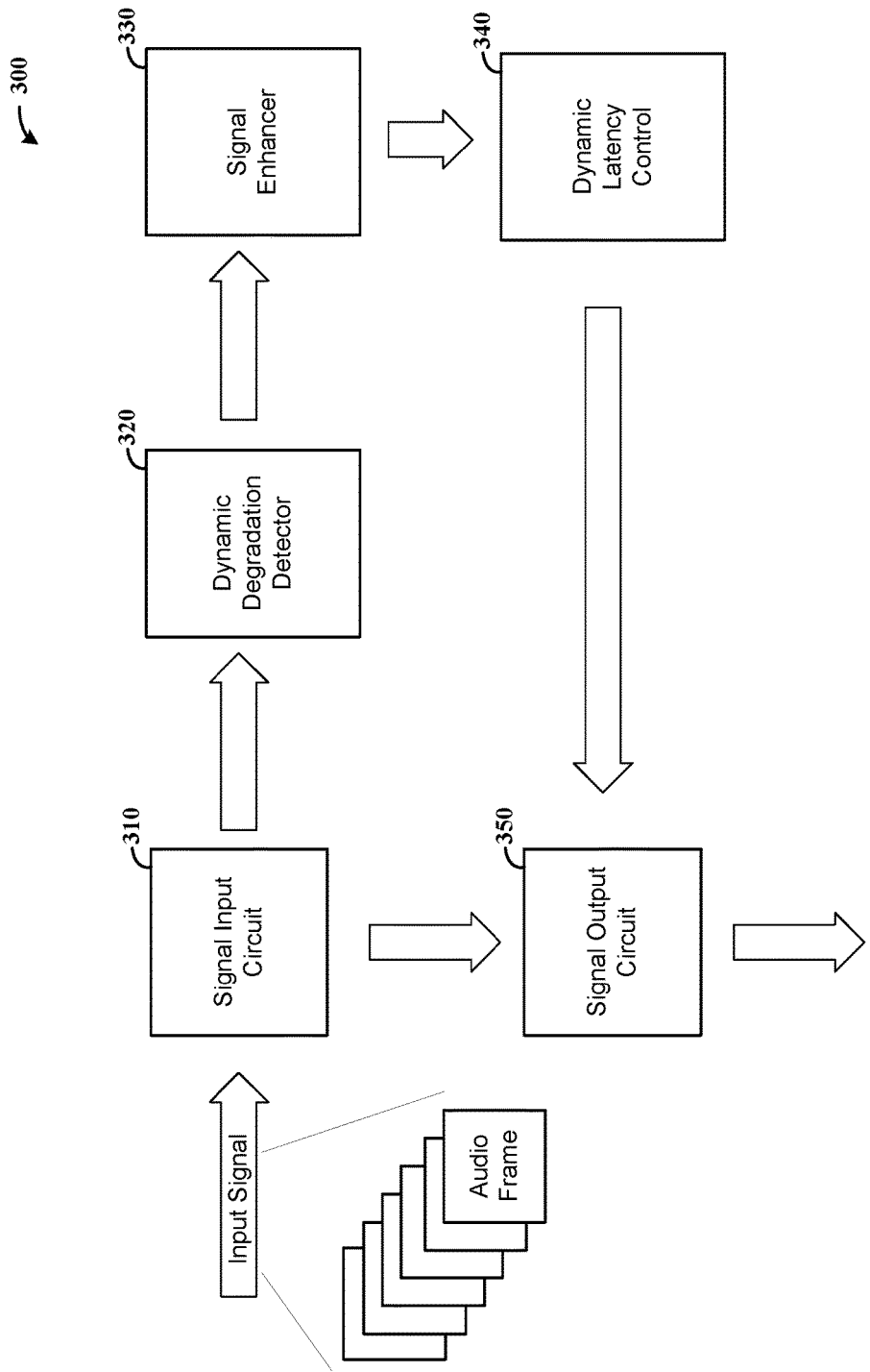
FIG. 3 is an apparatus for dynamic latency control, in accordance with the present disclosure.

FIG. 3 shows an apparatus for dynamic latency control, as may be implemented in accordance with one or more embodiments. The apparatus 300 includes a signal input circuit 310, dynamic degradation detector 320, signal enhancer 330, dynamic latency control circuit 340, and signal output circuit 350. The signal input circuit 310 receives a signal having a number of frames, with a few frames shown by way of example. The dynamic degradation detector 320 indicates when a signal is sufficiently compromised that the benefit of increased latency is worth the cost (e.g., signal latency can be tolerated to achieve signal quality improvement), and vice versa. The signal enhancer 330 switches between operating in a low-latency mode and an increased-latency mode. The dynamic latency control circuit 340 dynamically increases and/or decreases the signal latency, which can be effected without introducing a significant perceptual disturbance. This may be carried out, for example, by causing a signal output circuit 350 to inject additional frames to, or remove frames from, the signal.

Increases and decreases in latency may be limited to a combined duration of a few overlapping signal-processing windows, which may be referred to as frames. For voice communications, these windows can be 20-30 msec in duration with a 50% overlap, so the total latency may fluctuate, for example, between 10 msec and 30 msec. For example, for a signal sampled at a rate of 16,000 samples per second, each time-window may consist of 512 successive samples with a shift of 256 samples between successive time-windows, and a standard Short-Time Fourier-Transform analysis-synthesis approach may be used to perform the required signal processing in the frequency domain. Voice communications can be initiated within a maximum allowable delay, but dynamically incorporate an additional delay (e.g., mid-sentence) when there is a sufficiently-severe intermittent degradation in speech quality. For instance, where 10 msec is a target delay, up to 20 msec may be added intermittently to address communication issues. This approach combines the benefit of a low-latency baseline communication experience with the benefit of an increased-latency noise suppression mechanism.

In an exemplary instantiation, the dynamic degradation detector 320 can be implemented with a real-time algorithm that produces an estimate of wind-noise severity for each successive signal time-window. For example, the relative amount of low-frequency energy in the signal spectrum can be used as a measure of wind-noise intensity in the current time-window, and a threshold can be established to distinguish between a low-noise state and a high-noise state. Temporal smoothing and/or other post-processing can be optionally applied to the sequence of wind-noise intensity estimates to minimize the amount of jitter in the threshold crossings. Higher-order logic can be employed to ensure that the degradation signal is always reset to zero after any significant pause in the conversation; this allows the baseline low-latency condition to be reliably re-established after each intermittent intervention.

The signal enhancer 330 may be used to alter the signal spectrum corresponding to each successive signal time-window by calculating and applying a unique gain to each frequency bin in the spectrum. This calculation can make use of information from signal spectra corresponding to time-windows both before and after the current time-window. In an exemplary instantiation, the number of look-ahead time-windows that the signal enhancer can access is allowed to toggle between a low-latency condition (e.g., one time-window of look-ahead) and an increased-latency condition (e.g., three time-windows of look-ahead), utilizing dynamic latency control as noted herein. Since wind noise tends to occur in short "bursts" of predominantly low-frequency energy, and since low-frequency energy in speech tends to be associated with sustained harmonics extending over many successive time-windows, the signal enhancer 330 can use the increased-latency condition to distinguish between the unwanted wind noise and the desired speech. For example, for the increased-latency condition, an improved gain suppression factor can be calculated for each spectral frequency band by assessing the variability of the spectral energy for the band in question over seven successive time-windows, three in the past and three in the future. An analysis may be implemented such that greater observed variability is treated with greater suppression.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, signal enhancer, degradation detector, and/or other circuit-type depictions (e.g., reference numerals 320, 330 and 340 FIG. 3 depict a block/module as described herein). Such circuits or circuitry are used together with other elements to exemplify how certain embodiments may be carried out in the form or structures, steps, functions, operations, activities, etc. For example, in certain of the above-discussed embodiments, one or more illustrated items in this context represent circuits (e.g., discrete logic circuitry or (semi-)programmable circuits) configured and arranged for implementing these operations/activities, as may be carried out in the approaches shown in FIGS. 1-3. In certain embodiments, such illustrated items represent one or more computer circuitry (e.g., microcomputer or other CPU) which is understood to include memory circuitry that stores code (program to be executed as a set/sets of instructions) for performing a basic algorithm (e.g., noise suppression) or the more complex process/algorithm as described above for processing audio signals with the steps, functions, operations, activities, etc. The specification may also make reference to an adjective that does not connote any attribute of the structure ("first [type of structure]" and "second [type of structure]") in which case the adjective is merely used for English-language antecedence to differentiate one such similarly-named structure from another similarly-named structure (e.g., "first circuit configured to convert . . . " is interpreted as "circuit configured to convert . . . "). On the other hand, specification may make reference to an adjective that is intended to connote an attribute of the structure (e.g., dynamic latency controller), in which case the adjective (dynamic latency) modifies at least a portion of the named structure (controller) is configured to have/perform that attribute (e.g., dynamic latency controller refers to at least a portion of a control circuit that includes/performs the attribute of controlling latency).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, a variety of different types of signals may be processed in accordance with embodiments herein, such as to process audiovisual signals. In such applications, latency may be injected or removed to accommodate audio playback, or other aspects such as video where increased latency is acceptable for video with less motion. Such modifications do not depart from the true spirit and scope of various aspects of the disclosure, including aspects set forth in the claims.

What is claimed is:

1. An apparatus comprising:
a first circuit configured and arranged to assess a quality characteristic of an audio signal having time-sequenced frames exhibiting a signal quality, and to provide an output indicative of the signal quality;
a second circuit configured and arranged to dynamically adjust an amount of latency in the audio signal, based on the output indicative of the signal quality; and
a third circuit configured and arranged with the second circuit to:
for each of the time-sequenced frames,
assess at least one additional frame associated with the audio signal and corresponding to a future time using time provided via the latency, and
modify the time-sequenced frame based on the assessment of the at least one additional frame.

2. The apparatus of claim 1, wherein
the third circuit is configured and arranged with the second circuit to assess the at least one additional frame by assessing noise in a number of additional ones of the time-sequenced frames corresponding to a future time relative to the frame being modified, based on a timeframe defined by the amount of latency, and
the second circuit is configured and arranged to increase or decrease the amount of latency to provide a desired number of the at least one additional frames to be assessed, therein providing a trade-off between latency and performance enhancement in processing of the audio signal.

3. The apparatus of claim 1, wherein the second circuit is configured and arranged to dynamically adjust the amount of latency in the audio signal based on a content characteristic of the audio in the signal and a predefined amount of acceptable latency associated with the content characteristic.

4. The apparatus of claim 3, wherein the content characteristic is indicative of one of a plurality of types of audio communication, wherein each type of audio communication has a predetermined amount of acceptable latency associated therewith.

5. The apparatus of claim 1, wherein the third circuit is configured and arranged with the second circuit to assess the at least one additional frame by assessing additional frames associated with the audio signal later in time relative to the frame being corrected and within a timeframe provided by the latency.

6. The apparatus of claim 1, wherein the second circuit is configured and arranged to dynamically adjust the amount of latency in the audio signal based on an expected increase in quality of the signal gained relative to an increase in the latency.

7. The apparatus of claim 1, wherein the second circuit is configured and arranged to dynamically adjust the amount of latency in the audio signal by:
increasing the amount of latency in response to the signal degrading beyond a predefined amount of degradation; and
after increasing the amount of latency, reducing the amount of latency in response to the signal recovering such that the amount of degradation of the signal is within the predefined amount.

8. The apparatus of claim 1, wherein the second circuit is configured and arranged to dynamically adjust the amount of latency in the audio signal by increasing and decreasing the amount of latency over time in response to respective increases and decreases in quality of the signal.

9. The apparatus of claim 1, wherein the second circuit is configured and arranged to dynamically adjust the amount of latency in the audio signal by:
operating in a low-latency mode in response to the signal exhibiting a high level of signal quality; and operating an increased-latency mode in response to the signal exhibiting a low level of signal quality that is lower than the high level of signal quality.

10. The apparatus of claim 1, wherein the second circuit is configured and arranged to dynamically adjust the amount of latency in the audio signal by:
increasing latency in the audio signal by adding at least one time-sequenced frame to the audio signal; and
decrease latency in the audio signal by removing at least one time-sequenced frame from the audio signal.

11. The apparatus of claim 1, wherein the second circuit is configured and arranged to identify parts of speech in the audio signal, and to dynamically adjust the amount of latency for different portions of the audio signal based on, for each of the different portions, an identified part of speech that the portion pertains to.

12. The apparatus of claim 1, wherein the second circuit is configured and arranged to process audio signals including speech by increasing the amount of latency for portions of the audio signal corresponding to portions of the signal exhibiting low speech energy, and decreasing the amount of latency for portions of the audio signal corresponding to portions of the signal exhibiting relatively higher speech energy.

13. The apparatus of claim 1, wherein the third circuit is configured and arranged with the second circuit to correct the respective time-sequenced frames by removing noise from each frame based on the assessed at least one additional frame.

14. A method comprising:
assessing a quality characteristic of an audio signal exhibiting a signal quality;
providing an output indicative of the signal quality based on the assessing;
dynamically adjusting an amount of latency in the audio signal, based on the output indicative of the signal quality; and
assessing at least one additional frame associated with the audio signal and corresponding to a future time using time provided via the latency, and modifying respective time-sequenced frames in the audio signal based on the assessing of the at least one additional frame.

15. The method of claim 14, wherein
assessing the at least one additional frame includes assessing noise in a number of additional ones of the time-sequenced frames corresponding to a future time relative to the frame being modified, based on a timeframe defined by the amount of latency, and
adjusting the amount of latency in the audio signal includes increasing or decreasing the amount of latency to provide a desired number of the at least one additional frames to be assessed.

16. The method of claim 14, wherein dynamically adjusting the amount of latency in the audio signal includes increasing or decreasing the amount of latency based on a content characteristic of the audio in the signal and a predefined amount of acceptable latency associated with the content characteristic.

17. The method of claim 14, wherein dynamically adjusting the amount of latency in the audio signal includes increasing and decreasing the amount of latency over time respectively in response to increases and decreases in quality of the signal.

18. The method of claim 14, wherein dynamically adjusting the amount of latency in the audio signal includes:
increasing latency in the audio signal by adding at least one time-sequenced frame to the audio signal; and
decreasing latency in the audio signal by removing at least one time-sequenced frame from the audio signal.

19. The method of claim 14, further including identifying parts of speech in the audio signal, and dynamically adjusting the amount of latency for different portions of the audio signal based on, for each of the different portions, an identified part of speech that the portion pertains to.

20. An apparatus comprising:
an input circuit configured and arranged to receive an audio signal exhibiting a signal quality; and
a computer circuit configured and arranged with the input circuit to
assess a quality characteristic of the audio signal;
provide an output indicative of the signal quality based on the assessing;
dynamically adjust an amount of latency in the audio signal, based on the output indicative of the signal quality; and
assess at least one additional frame associated with the audio signal and corresponding to a future time using time provided via the latency, and modifying respective time-sequenced frames in the audio signal based on the assessing of the at least one additional frame.

* * * * *